(12) United States Patent
Lam

(10) Patent No.: US 7,418,547 B2
(45) Date of Patent: Aug. 26, 2008

(54) SYSTEM AND METHOD TO PROTECT DATA STORED IN A STORAGE SYSTEM

(75) Inventor: Wai Lam, Jericho, NY (US)

(73) Assignee: FalconStor, Inc., Melville, NY (US)

(*) Notice: Subject to any disclaimer, the term of this patent is extended or adjusted under 35 U.S.C. 154(b) by 0 days.

(21) Appl. No.: 11/652,416

(22) Filed: Jan. 11, 2007

(65) Prior Publication Data
US 2007/0113017 A1 May 17, 2007

Related U.S. Application Data

(62) Division of application No. 10/612,081, filed on Jul. 2, 2003, now Pat. No. 7,165,145.

(51) Int. Cl.
*G06F 12/00* (2006.01)
(52) U.S. Cl. .............. 711/113; 711/135; 711/144; 711/154; 711/162; 707/204
(58) Field of Classification Search ........... 711/135, 711/113, 144, 154, 162; 707/204
See application file for complete search history.

(56) References Cited

U.S. PATENT DOCUMENTS

| | | | |
|---|---|---|---|
| 4,435,759 A * | 3/1984 | Baum et al. .......... | 714/44 |
| 5,088,058 A | 2/1992 | Salsburg | |
| 5,403,639 A | 4/1995 | Belsan et al. | |
| 5,644,701 A | 7/1997 | Takewaki | |
| 5,649,152 A | 7/1997 | Ohran et al. | |
| 5,790,773 A | 8/1998 | DeKoning et al. | |
| 5,845,295 A | 12/1998 | Houseman et al. | |
| 5,956,713 A | 9/1999 | Bamford et al. | |
| 6,038,639 A | 3/2000 | O'Brien et al. | |
| 6,081,875 A | 6/2000 | Clifton et al. | |
| 6,131,148 A | 10/2000 | West et al. | |

(Continued)

FOREIGN PATENT DOCUMENTS

WO   WO/96/12232   4/1996

(Continued)

OTHER PUBLICATIONS

IEEE 100—The Authoritative Dictionary of IEEE Standards Terms, 7th Edition., definitions of "record" and "snapshot"; Dec. 2000.

*Primary Examiner*—Stephen C Elmore
(74) *Attorney, Agent, or Firm*—Brandon N. Sklar; Jonathan Tyler; Kaye Scholer LLP

(57) ABSTRACT

In an example of an embodiment of the invention, a method is provided for recording data transmitted to a storage system, wherein the storage system has a cache and at least one storage device, and the data comprises initial data items that are transmitted to the storage system prior to a moment in time and additional data items that are transmitted to the storage system after the moment in time. The method comprises receiving, by the cache, data transmitted to the storage system, and flushing, from the cache to the at least one storage device, one or more of the initial data items. The method also comprises receiving, by the cache, one or more additional data items, while at least one of the initial data items is flushed from the cache, and recording the initial data items. Systems are also disclosed.

18 Claims, 10 Drawing Sheets

U.S. PATENT DOCUMENTS

| | | | |
|---|---|---|---|
| 6,182,196 B1 * | 1/2001 | DeRoo | 711/144 |
| 6,182,198 B1 | 1/2001 | Hubis et al. | |
| 6,237,001 B1 | 5/2001 | Bamford et al. | |
| 6,298,403 B1 | 10/2001 | Suri et al. | |
| 6,311,193 B1 | 10/2001 | Sekido | |
| 6,421,767 B1 | 7/2002 | Milillo et al. | |
| 6,434,681 B1 | 8/2002 | Armangau | |
| 6,728,736 B2 | 4/2004 | Hostetter et al. | |
| 6,779,095 B2 | 8/2004 | Selkirk et al. | |
| 6,799,258 B1 * | 9/2004 | Linde | 711/162 |
| 6,834,326 B1 | 12/2004 | Wang et al. | |
| 6,993,627 B2 | 1/2006 | Butterworth et al. | |
| 6,999,956 B2 | 2/2006 | Mullins | |
| 7,043,485 B2 | 5/2006 | Manley et al. | |
| 7,165,145 B2 | 1/2007 | Lam | |
| 2004/0128456 A1 | 7/2004 | Kobayashi et al. | |
| 2007/0113016 A1 | 5/2007 | Lam | |

FOREIGN PATENT DOCUMENTS

| | | |
|---|---|---|
| WO | WO/98/53400 | 11/1998 |
| WO | WO/99/63441 | 12/1999 |
| WO | WO/01/67247 A1 | 9/2001 |
| WO | WO/02/29573 A2 | 4/2002 |
| WO | WO/02/103508 A2 | 12/2002 |
| WO | WO/03/014933 A1 | 2/2003 |

* cited by examiner

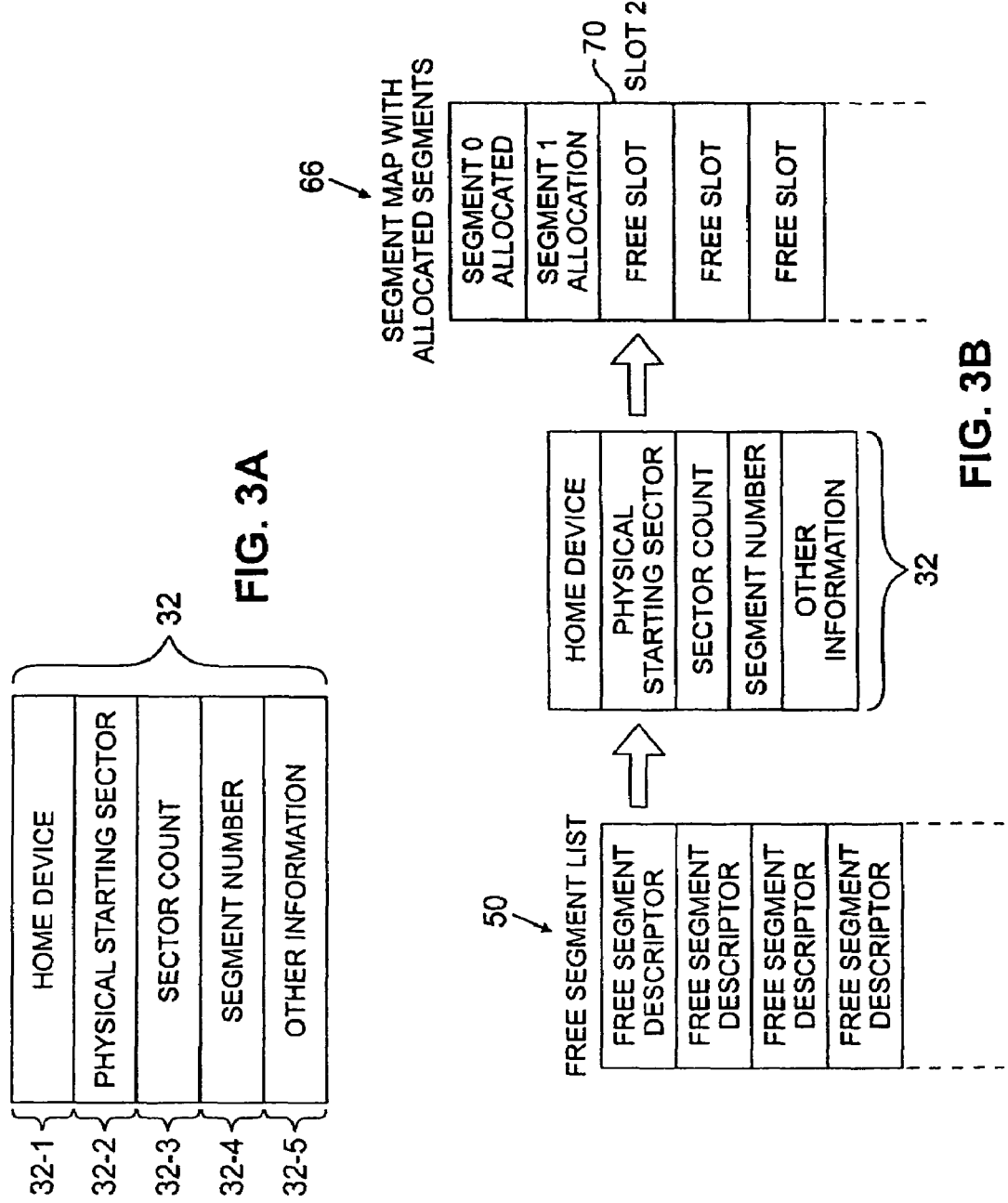

SYSTEM AND METHOD TO PROTECT DATA STORED IN A STORAGE SYSTEM

The present application is a division of U.S. application Ser. No. 10/612,081, filed Jul. 2, 2003 now U.S. Pat. No. 7,165,145, which issued on Jan. 16, 2007, is assigned to the assignee of the present application, and is incorporated by reference herein in its entirety.

FIELD OF THE INVENTION

The invention relates generally to a system and method for storing data, and more particularly, to a method and system for performing snapshots of data stored in a storage system.

BACKGROUND OF THE INVENTION

Generating a snapshot of data is a method commonly used to preserve and protect data stored in a storage system. A snapshot is a record of data stored in a storage system at a selected moment in time. A snapshot may be used, for example, to recover an earlier version of the data in the event a current version becomes corrupted, or may be copied to another storage device to provide a backup copy of the data.

In many storage systems, performing a snapshot is a relatively simple operation. However, if a cache is used in the storage system, performing the snapshot often becomes more challenging. Typically, a cache functions as a buffer, i.e., data sent by the client server to disk is recorded first in the cache, and subsequently is flushed to the disk. A cache is typically constructed of a type of memory that can be accessed more rapidly than the primary storage devices in the system. Accordingly, a storage system can increase its efficiency by temporarily storing in the cache selected items of data that are likely to be requested by a client. Many storage systems, operating on the principle that data recently sent to disk have a high probability of being accessed again, uniformly transmit data to a cache before sending it to disk. As used herein, the term "disk" has the same meaning as "storage device;" accordingly, "stored on disk" means stored on a storage device, "sent to disk" means sent to a storage device, etc. "Client" and "client server" are used herein interchangeably.

In many storage systems, a cache processes data sequentially to preserve data integrity. Changes made by a client server to a data file, for example, are recorded in the cache in the order they were performed and flushed to disk in the same order. Where a cache receives data from multiple clients, the cache typically processes data from a given client sequentially; however, the cache may assign a higher priority to data received from one client over data received from other clients. In such a case, the cache may not adhere to a strict first-in-first-out mode of operation.

To preserve data integrity, a snapshot must capture and preserve all data sent to disk by the client server up to the precise moment the snapshot is requested. However, where a cache is used, some data sent to disk by a client before the snapshot request may remain in the cache, not yet having been flushed to disk, at the moment the snapshot request is made. In such case, performing a snapshot of data stored on disk at the moment the request is made would produce an inaccurate record because it would not capture the data remaining in the cache at that moment. To produce an accurate snapshot, it is necessary to incorporate the data from the cache into the snapshot.

One solution to this problem requires first directing the client server to suspend transmission of data to the storage system. All data in the cache is then flushed to disk, and finally the snapshot is performed. This method may be adequate if very little data is present in the cache at the moment the snapshot is requested. Otherwise, this method is often undesirable because the client server is required to wait for the data flush to finish before it can resume normal operations. This can represent a substantial inconvenience to the client server and compromise the efficiency of the data storage provider.

It is often useful to generate a snapshot of data before performing a data processing task that poses a risk of corrupting data in a storage system. For example, in many systems simply maintaining a backup copy of a primary disk can occasionally pose substantial risks. If, for example, the system employs asynchronous mirroring, i.e., a cache is used to temporarily store data written to the primary disk before writing to the mirroring disk, an interruption in the communication between the cache and the mirroring disk can cause data to be lost and the backup copy to become corrupted. Generally, in such case it is necessary to synchronize the mirroring disk with the primary disk, i.e., simply copy data sector-by-sector from the primary disk to the mirroring disk. However, if the primary disk becomes corrupted before the copying procedure is completed, then there may be no uncorrupted version of the primary disk left. Moreover, in such case, the data on the mirroring disk is often corrupted by an incomplete copy procedure. It is therefore often preferable to generate a snapshot of the mirroring disk immediately before attempting to synchronize the mirroring disk with the main disk.

Many existing storage systems fail to determine a suitable moment for taking a snapshot. This is partly due to the fact that, in many networks, a client server (such as a data server) manages the data processing and storage functions, and storage systems merely process requests received from the client server. Therefore, the client server, rather than the storage system, determines an appropriate time for a snapshot. However, in prior art systems, the client server does not have the capability to direct the storage system to perform a snapshot at a selected moment. Instead, many storage systems are configured simply to perform snapshots at predetermined intervals, e.g., every 30 minutes.

SUMMARY OF THE INVENTION

Accordingly, there is a need for a method and system for performing snapshot copies of data stored in a data storage system in a manner that captures data transmitted to disk by a client server prior to the snapshot request without requiring the client server to cease sending data to the storage system. There is additionally a need for a system that enables a client server to direct a storage system on a network to perform a snapshot.

Embodiments of the present methods and systems provide for generating a snapshot that records desired data, while allowing a client server to continue sending data to the storage system. In accordance with one embodiment of the invention, a method is provided for recording data transmitted to a storage system, wherein the storage system has a cache and at least one storage device, and the data comprises initial data items that are transmitted to the storage system prior to a moment in time and additional data items that are transmitted to the storage system after the moment in time. The method comprises receiving, by the cache, data transmitted to the storage system, and flushing, from the cache to the at least one storage device, one or more of the initial data items. The method also comprises receiving, by the cache, one or more additional data items, while at least one of the initial data items is flushed from the cache, and recording the initial data items.

In one example, the cache comprises non-volatile memory. In an alternative example, the cache comprises volatile memory. Initial data items and additional data items may be received from a single client server, or, alternatively, from a plurality of client servers. The at least one storage device may comprise a block-level storage device.

In accordance with another embodiment of the invention, a system is provided for recording data transmitted to a storage system, wherein the data comprising initial data items that are transmitted to the storage system prior to a moment in time, and additional data items that are transmitted to the storage system after the moment in time. The storage system comprises a cache configured to receive data transmitted to the storage system, flush one or more of the initial data items to the at least one storage device, and receive one or more additional data items while flushing at least one of the initial data items. The storage system also comprises a controller configured to record the initial data items.

In one example, the cache comprises non-volatile memory. In an alternative example, the cache comprises volatile memory. Initial data items and additional data items may be received from a single client server, or, alternatively, from a plurality of client servers.

BRIEF DESCRIPTION OF THE DRAWINGS

These and other features and advantages of the invention will be apparent to those skilled in the art from the following detailed description of preferred embodiments, taken together with the accompanying drawings, in which:

FIG. 3A illustrates the contents of a segment descriptor in accordance with one implementation of the invention;

FIG. 3B illustrates a free segment list, a segment descriptor, and a segment map used to manage data in accordance with a dynamic disk space allocation technique;

DETAILED DESCRIPTION OF THE PREFERRED EMBODIMENTS

Figure 1:
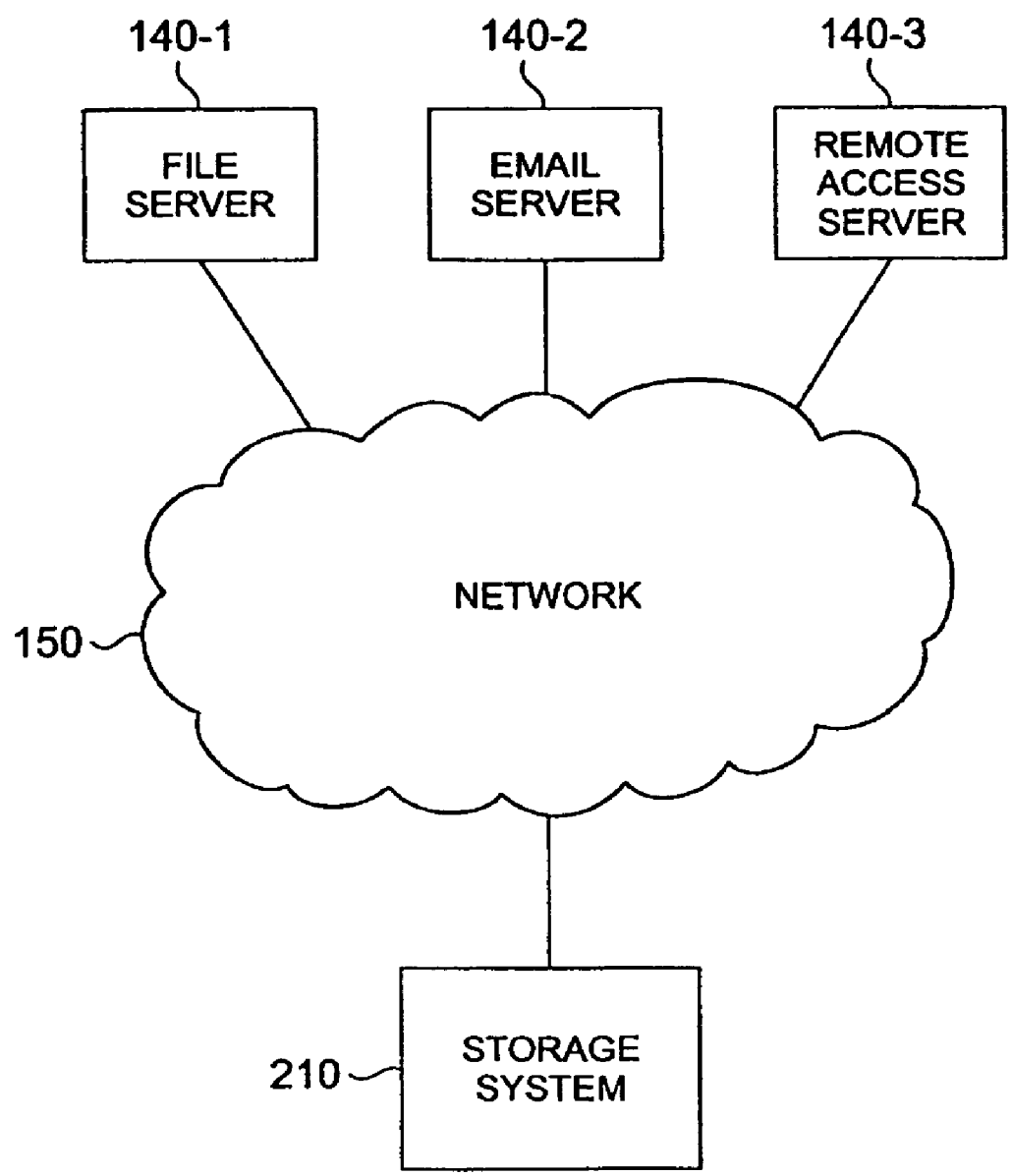
FIG. 1 illustrates a network for generating snapshots in accordance with one implementation of the invention.

FIG. 1 illustrates a network for generating snapshots in accordance with an aspect of the invention. Client servers 140-1, 140-2 and 140-3 are connected over network 150 to storage system 210. Each of client servers 140-1, 140-2 and 140-3 may be any device or software application that accesses data from storage system 210. In one implementation, client servers 140 are server systems that provide software applications and services for users. In one implementation, each client server is a software application executing on a distinct machine, e.g., a computer. For example, according to this implementation, client server 140-1 is a file server application running on a workstation, client server 140-2 is an email server application running on a desktop PC, etc. In an alternative implementation, client servers 140-1, 140-2 and 140-3 all reside and execute on a single computer. It should be noted that, although for purposes of illustration, a file server, an email server and a remote access server are shown in FIG. 1, client servers 140-1, 140-2 and 140-3 may be implemented as server applications of any type. It should also be noted that, although for purposes of illustration, three client servers are shown, any number of client servers may be included.

Network 150 may be implemented as any one of a number of different types of networks. In accordance with one implementation, communications are conducted over network 150 by means of IP protocols. In accordance with another implementation, communications are conducted over network 150 by means of Fibre Channel protocols. Thus, network 150 may be, for example, an intranet, a local area network (LAN), a wide area network (WAN), an internet, Fibre Channel storage area network (SAN) or Ethernet. Alternatively, network 150 may be implemented as a combination of different types of networks.

Figure 2:
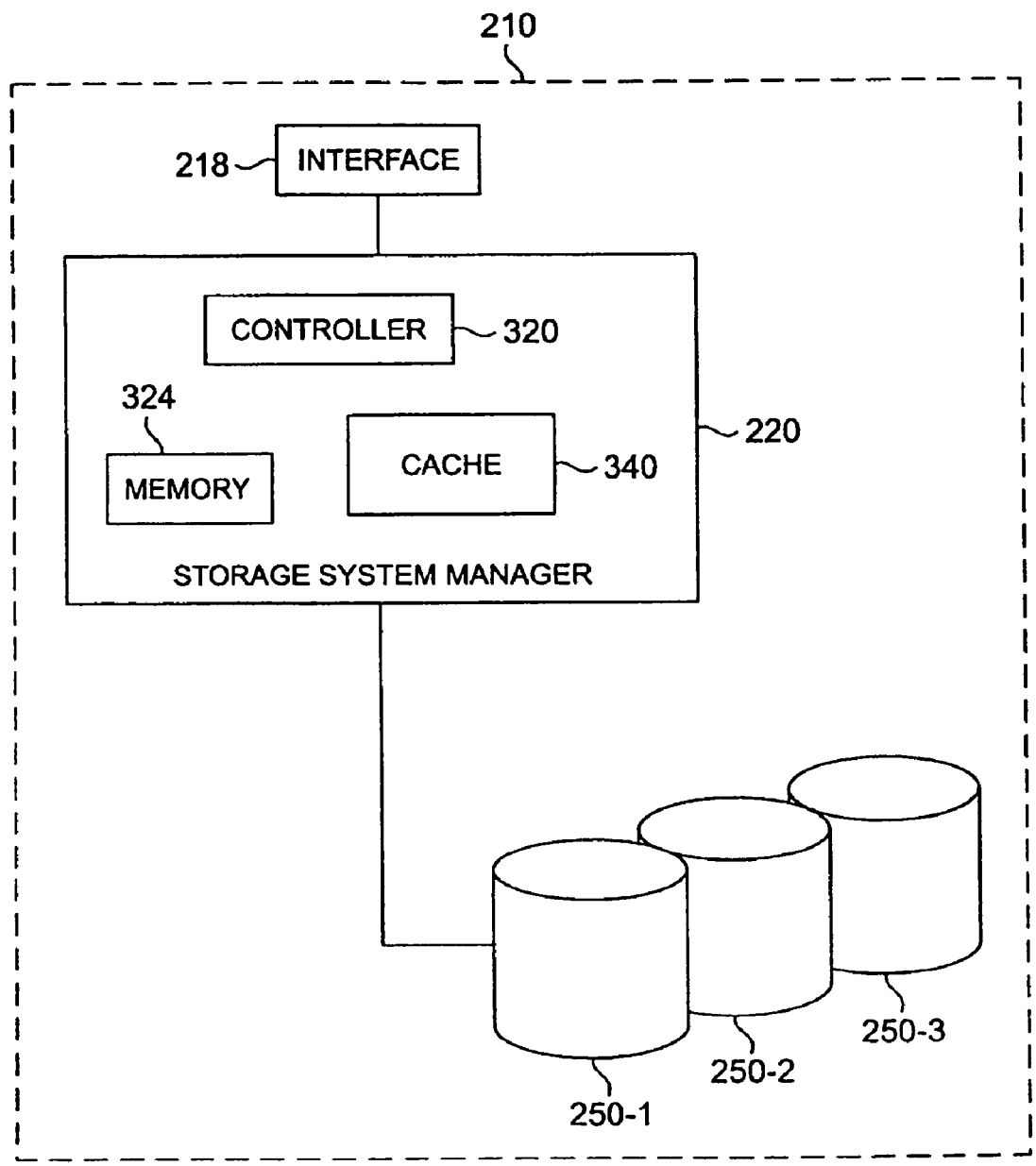
FIG. 2 illustrates components of a storage system in accordance with one implementation of the invention.

FIG. 2 illustrates components of storage system 210 used for storing data in accordance with an aspect of the invention. Storage system 210 includes interface 218, storage system manager 220 and storage devices 250-1, 250-2 and 250-3. It should be noted that although three storage devices are shown in FIG. 2, storage system 210 may include any number of storage devices.

Interface 218 provides a communication gateway through which data may be transmitted between storage system 210 and network 150. Interface 218 may be implemented using a number of different mechanisms, such as one or more SCSI cards, enterprise systems connection cards, fiber channel interfaces, modems, network interfaces, or a network hub.

Storage system manager 220 comprises a controller 320, memory 324 and cache 340. Controller 320 orchestrates the operations of storage system manager 220, including receiving and processing data processing requests from network 150, and sending data processing commands to storage devices 250-1, 250-2 and 250-3. Controller 320 receives from network 150 data processing requests formatted according to IP or Fibre Channel protocols.

Communications between controller 320 and storage devices 250 are conducted in accordance with SCSI protocols. Accordingly, controller 320 transmits data processing commands to, and receives data from, storage devices 250, in accordance with SCSI protocols. In one implementation, controller 320 is implemented by a software application. In an alternative implementation, controller 320 is implemented by a combination of software and digital or analog circuitry.

Memory 324 is used by controller 320 to manage the flow of data to and from, and the location of data on, storage devices 250. For example, controller 320 may store in memory 324 various tables indicating the locations and types of various items of data stored in storage devices 250.

Cache 340 functions as a buffer between controller 320 and storage devices 250. Data assigned to an address on a storage device is first written in cache 340, and subsequently flushed to disk. In one implementation, data written in cache is managed on a first-in-first-out basis, to ensure that changes made to a given data file are recorded in the correct order. Accordingly, data is written sequentially to cache 340 and, similarly, data is flushed from cache 340 to disk in sequential order. In alternative implementations, cache 340 does not maintain a strict first-in-first-out mode of operation, but instead processes data according to priorities established by controller 320. For example, in one such implementation, cache 340 receives data from more than one client, but assigns a higher priority to data received from a specified client than to data received from other clients. Nevertheless, in this implementation, cache 340 maintains a first-in-first out mode of operation with respect to data received from any given client. Cache 340 may store data either in volatile or by non-volatile memory.

Each of storage devices 250 may be any type of storage device that allows block-level storage access. In one implementation, storage devices 250 are disk drives. A disk drive includes one or more disks having a medium upon which information may be written. Each disk includes a number of physical tracks, each of which, in turn, is divided into one or more physical blocks. Accordingly, in this implementation, an address identifying the location of a data block on a disk drive may specify a disk, a physical track and a physical block. Storage devices 250-1, 250-2 and 250-3 are connected to storage system manager 220, in accordance with this implementation, by Fibre Channel interfaces, SCSI connections, or a combination thereof.

One implementation by which storage system manager 220 allocates disk space for storing data is described below as an example. It should be noted, however, that this implementation is for illustrative purposes only and that other techniques for allocating disk space may be used.

Storage system manager 220 may dynamically allocate disk space according to a technique that assigns disk space to a virtual disk drive as needed. The dynamic allocation technique functions on a drive level. In such instances, disk drives that are managed by storage system manager 220 are defined as virtual drives. The virtual drive system allows an algorithm to manage a "virtual" disk drive having assigned to it an amount of virtual storage that is larger than the amount of available physical storage. Accordingly, large disk drives can virtually exist on a system without requiring an initial investment of an entire storage subsystem. Additional storage may then be added as it is required without committing these resources prematurely. Alternatively, a virtual disk drive may have assigned to it an amount of virtual storage that is smaller than the amount of available physical storage.

According to this implementation, when storage system manager 220 initially defines a virtual storage device, or when additional storage is assigned to the virtual storage device, the disk space on the storage devices is divided into segments. Each segment has associated with it segment descriptors, which are stored in a free list table in memory. Generally, a segment descriptor contains information defining the segment it represents; for example, the segment descriptor may define a home storage device location, physical starting sector of the segment, sector count within the segment, and segment number. FIG. 3A illustrates schematically the contents of a segment descriptor 32. Fields 32-1 through 32-5 contain data indicating, respectively, on which storage device the segment is located, the segment's starting physical address, the segment's size, a segment identifier, and other information which may be useful for identifying and processing the segment.

Referring to FIG. 3B, as segments are needed to store data, the next available segment descriptor, e.g., segment descriptor 32, is identified from the free segment list 50, the data is stored in the segment, and the segment descriptor 32 is assigned to a new table called a segment map 66. The segment map 66 maintains information representing how each segment defines the virtual storage device. More specifically, the segment map provides the logical sector to physical sector mapping of a virtual storage device. After the free segment descriptor 32 is moved or stored in the appropriate area of the segment map 66, which in this example is slot 2 (70), the descriptor is no longer a free segment but is now an allocated segment. A detailed description of this method for dynamically allocating disk space can be found in U.S. Pat. No. 7,058,788, dated Jun. 6, 2006, which is incorporated herein by reference in its entirety.

To preserve the contents of selected data files at a selected moment in time, storage systems commonly generate snapshots of the selected data. If a cache is used, some data sent to disk by a client immediately before the snapshot request may remain in the cache, not yet having been flushed to disk, at the moment the snapshot request is made. All such data must be incorporated into the snapshot in order to produce an accurate record.

Figure 4A:
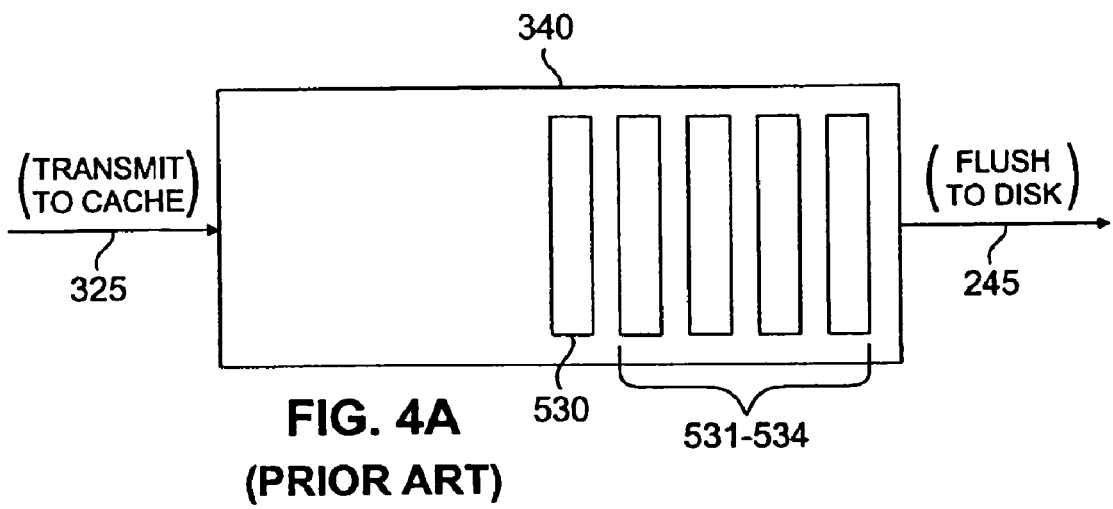
FIGS. 4A-4C show the contents of a cache at various points during the process of performing a snapshot in accordance with a prior art technique.
Figure 4B:
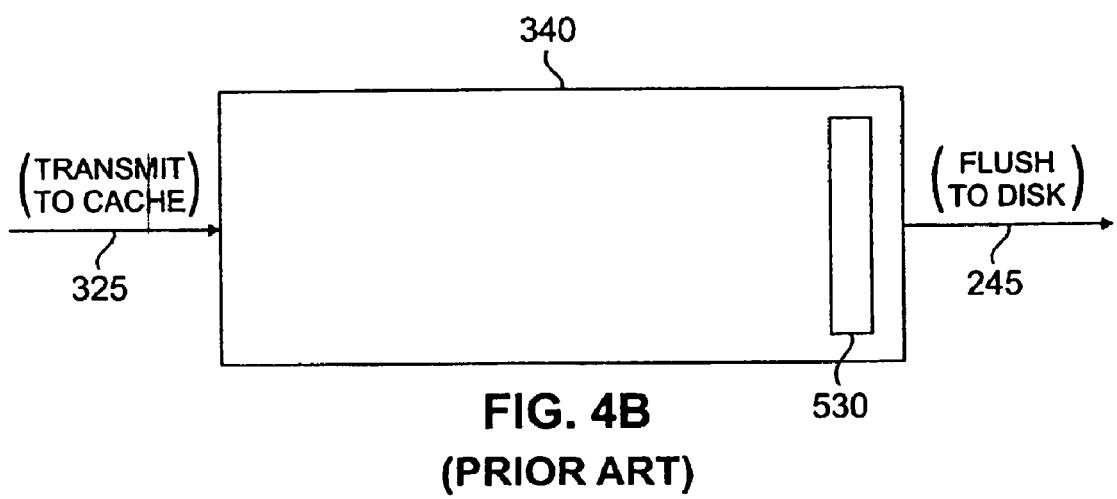
Figure 4C:
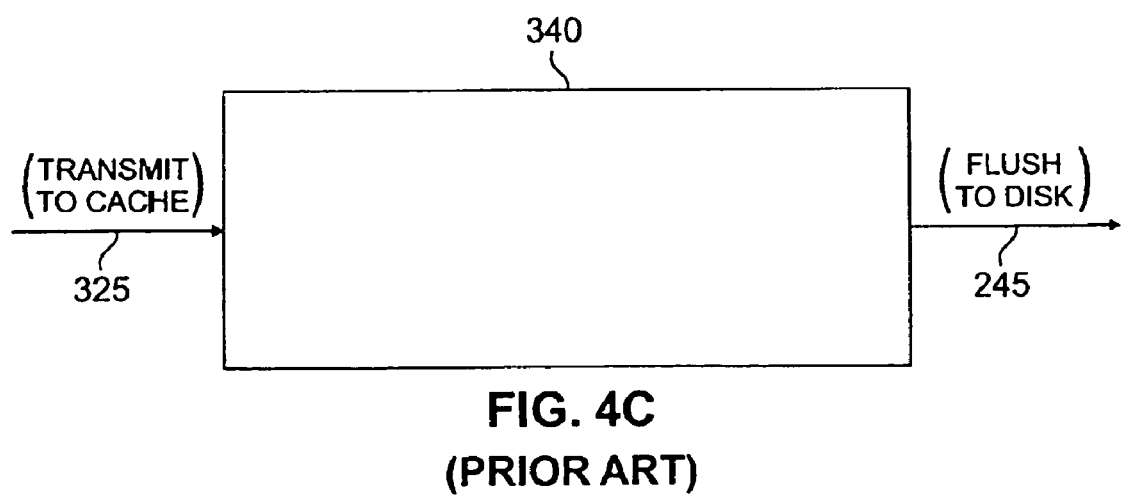

One technique for performing snapshots that is known in the art entails first directing the client server to suspend transmissions of data to disk. Data in the cache is then flushed to disk, and then the snapshot is performed. This prior art method is illustrated with reference to FIGS. 4A-4C. In this example, all data items inserted in cache 340 originate from a single client server, e.g., file server 140-1. FIG. 4A illustrates the contents of cache 340 at the moment controller 320 determines that a snapshot of data in one or more storage devices is requested. At that moment, cache 340 contains a queue made up of data items 530-534. It should be noted that the direction arrow 325 represents data transmitted to cache 340 for entry into the queue. The direction arrow 245 represents data flushed from cache 340. Referring to FIG. 4A, data item 530 is the last data item in the queue, indicating that it was the last data item transmitted to cache 340. After controller 320 determines that a snapshot has been requested, controller 320 stops transmitting data to cache 340 and waits until cache 340 flushes all of its contents to storage devices 250. If the snapshot request was received from a client server, e.g., file server 140-1, controller 320 directs the file server to temporarily cease transmitting data to disk. FIG. 4B illustrates schematically the contents of cache 340 after data items 531-534 have been flushed to disk, but before data item 530 has been flushed to disk. FIG. 4C illustrates schematically the contents of cache 340 after data item 530 has been flushed to disk. Cache 340 is now empty. At this point, controller 320 detects that cache 340 is empty and performs the snapshot. Controller 320 notifies file server 140-1 that it may continue transmitting data to disk.

It should be noted that FIGS. 4A-4C are figurative illustrations. The data items shown in FIGS. 4A-4C are presented as if they are moving from left to right to illustrate their position in the queue. However, inside a cache in a computer, there is no physical moment of data; instead, transfers of data are accomplished by electrical signals. It should further be noted that although in the example illustrated by FIGS. 4A-4C cache 340 receives data from only one client server, in many storage systems a cache receives data from multiple client servers.

This method of performing snapshots, as described with reference to FIGS. 4A-4C, may impose considerable inconveniences on the client server as well as on the storage provider. For example, the client server is required to wait for the data flush to finish before it can resume normal operations. Such inconveniences may be overcome by generating a snapshot of data in response to a snapshot request, while ensuring that the snapshot incorporates all data sent to disk prior to the time the snapshot request is made. In addition, such inconveniences may be overcome by eliminating the need to suspend the transmission of data between the client server and storage system while a snapshot operation is being performed.

In accordance with one aspect of the invention, upon determining that a snapshot has been requested, controller 320 of storage system manager 220 inserts a snapshot marker into cache 340. While the snapshot marker remains in cache 340, storage system manager continues to flush data from cache 340 to disk. Once the snapshot marker is flushed to disk, the snapshot is performed.

Figure 5:
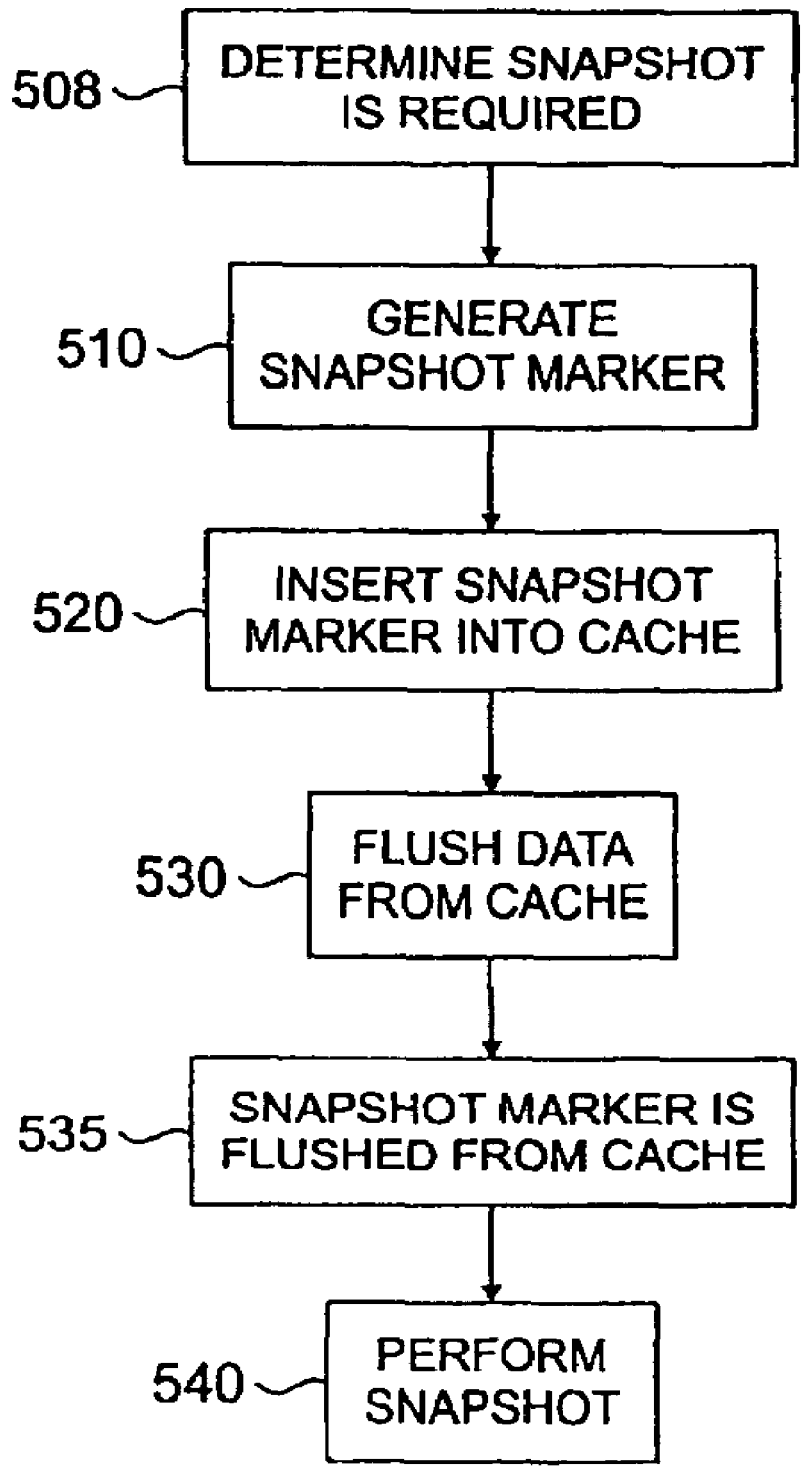
FIG. 5 is a flowchart describing a method for performing a snapshot in accordance with one implementation of the invention.

FIG. 5 is a flowchart describing a method for performing a snapshot, in accordance with this aspect of the invention. In addition, this method is illustrated with reference to FIGS. 6A-6D. At step 508, controller 320 determines that a snapshot should be made. Any one of several different types of events may prompt this determination. For example, controller 320 may receive a snapshot request from a client server, e.g., file server 140-1. Alternatively, controller 320 may determine that the normal operation of the storage system dictates that a snapshot should be made, e.g., controller 220 may be programmed to periodically take snapshots of selected blocks of data stored in storage devices 250-1, 250-2 and 250-3.

At step 510, controller 320 generates a snapshot marker. The snapshot marker is information that identifies the last item of data that is to be sent to disk before the snapshot is performed. According to one implementation, the snapshot marker comprises a data pattern that is statistically unlikely to occur in transmissions that are received by storage system 210. For example, a snapshot marker may be implemented by the data string:

"$$$$SNAPSHOTMARKER****."

Figure 6A:
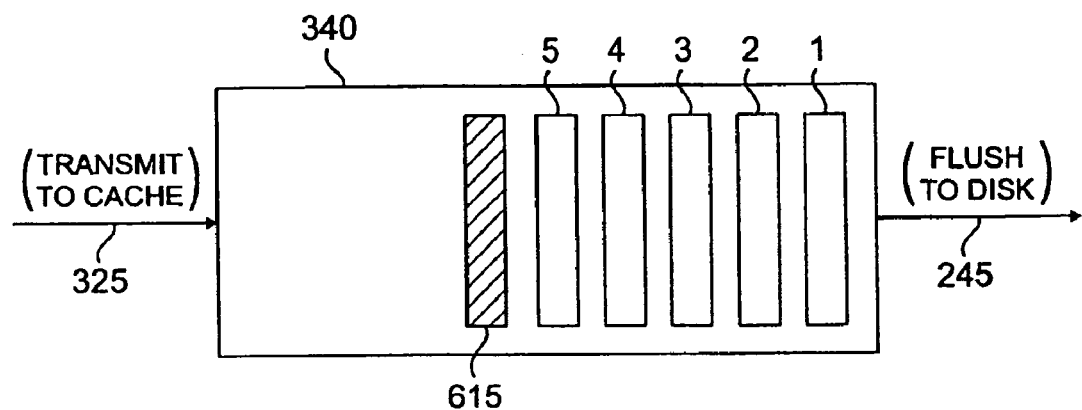
FIGS. 6A-6D show the contents of a cache at various points during the process of performing a snapshot in accordance with an aspect of the invention.

At step 520, controller 320 inserts the snapshot marker into cache 340. Because data is written sequentially to cache 340, the snapshot marker is inserted at the end of a queue maintained in cache 340. The other data items in the queue, if any, were written to cache 340 before the snapshot marker was inserted. Because these data items were sent to disk before the snapshot request was made, it is necessary to incorporate them into the snapshot in order to produce an accurate record. FIG. 6A shows the contents of cache 340 at the moment snapshot marker 615 is inserted. Cache contains data items 1-5 and snapshot marker 615. Data items 1-5 represent data inserted into cache 340 before snapshot marker 615 was inserted. Accordingly, data items 1-5 represent data sent to disk before the snapshot request was made.

It should be noted at this point that in the implementation illustrated by FIGS. 6A-6D, cache 340 operates on a first-in-first-out basis, i.e., all data sent to disk are sent first to cache and subsequently flushed to disk in the same order. However, other implementations may not operate in this manner. For example, a storage system that receives data from two different data servers may cache all data that is received, but assign a higher priority to data received from one of the servers. Accordingly, the system may first flush to disk any data from the high-priority data server that is present in the cache before flushing data from the other data server.

It should be further noted that the frequency with which data is flushed from cache 340 may differ depending on the particular implementation, and is typically not affected by the insertion into cache 340 of a snapshot marker. In one implementation, data is flushed to disk periodically at predetermined intervals.

Figure 6B:
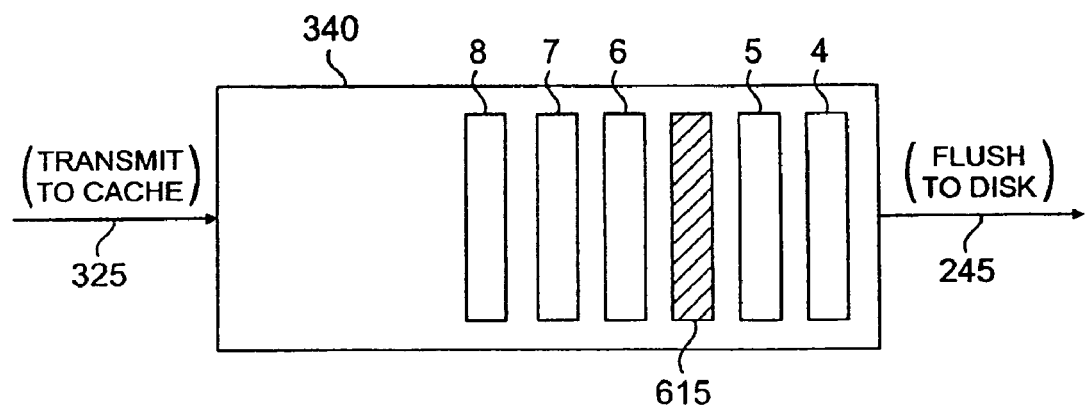

At step 530, controller 320 flushes data from cache 340. FIG. 6B illustrates schematically the contents of cache 340 after data items 1-3 have been flushed to disk. At this point, cache 340 contains data items 4-5, snapshot marker 615 and data items 6-8. Data items 6-8 represent data items that were inserted into cache 340 after the snapshot request was made.

Figure 6C:
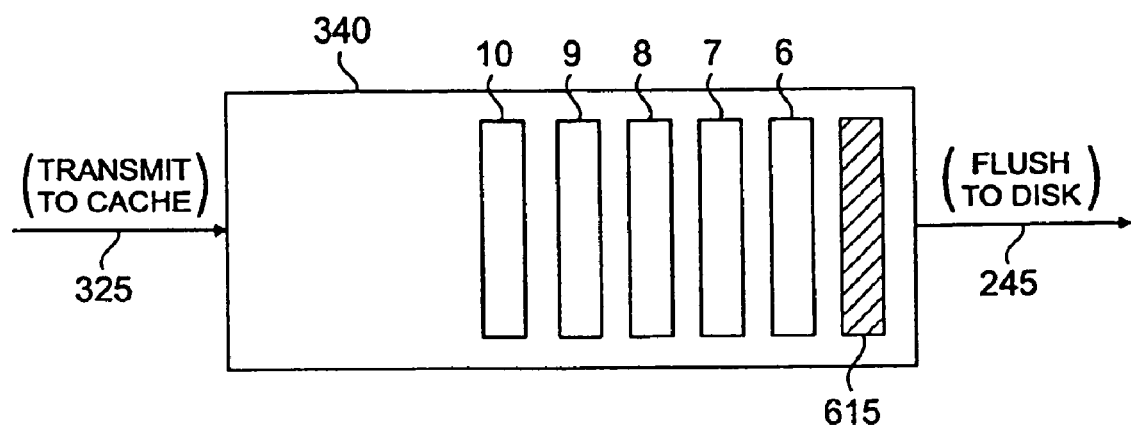

While the snapshot marker 615 remains in cache 340, controller 320 continues to flush data from cache 340 to disk. Referring to FIG. 6B, snapshot marker 615 remains in cache 340. Accordingly, controller 320 continues to flush data to disk. FIG. 6C shows the contents of cache 340 after data items 4-5 have been flushed to disk. The cache now contains snapshot marker 615 and data items 6-10, i.e., items that were added to cache after the snapshot request was made.

Figure 6D:
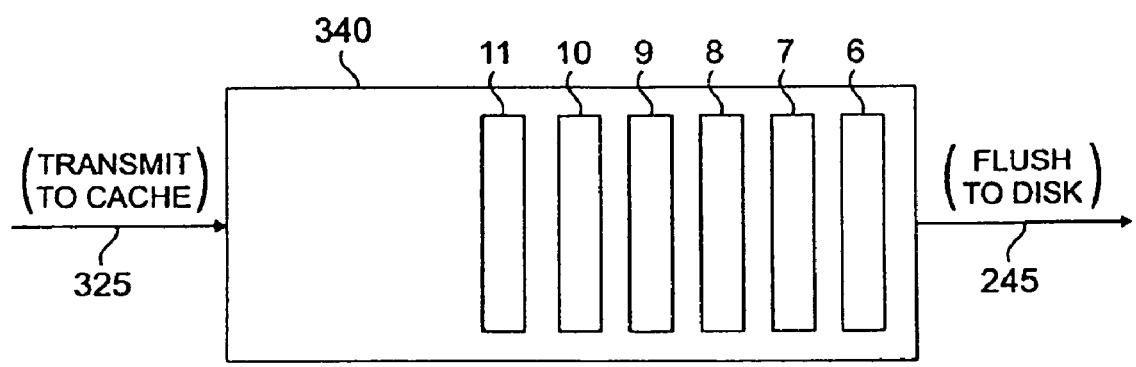

Because snapshot marker 615 continues to remain in cache 340, controller 320 continues to flush data to disk. At step 535, snapshot marker is flushed from cache to disk. FIG. 6D illustrates schematically the contents of cache 340 at the moment snapshot marker 615 has been flushed to disk. In this example, cache 340 contains data items 6-11. At this point, snapshot marker 615 is no longer in cache 340. Accordingly (referring to step 540), controller 320 immediately performs the requested snapshot.

SCSI Command

According to another aspect of the invention, a client server transmits a command representing a snapshot request to a storage system. The command is transmitted in accordance with standard protocols. The storage system receives the command and, in response, performs a snapshot.

It is often useful to generate a snapshot of data before performing a data processing task that poses a risk of corrupting data in a storage system. For example, in an asynchronous mirroring arrangement, it is often preferable to generate a snapshot of the mirroring disk before attempting to synchronize the mirroring disk with the main disk. In such a case, it is useful to automatically generate a snapshot immediately before the synchronization process begins.

According to one implementation, a client server, e.g., file server 140-1, transmits to storage system 210 a SCSI command that represents a snapshot request. The Small Computer System Interface (SCSI) is a standard for connecting computers to peripheral devices such as disk drives. The SCSI standard specifies the hardware and software interface between these devices at a level that minimizes dependencies on any specific hardware implementation. This is achieved by representing data stored on a storage device as a collection of logical blocks rather than in terms of the data's physical address. This abstraction allows the SCSI protocol to be used with a wide variety of devices.

The central item of hardware in a SCSI system is the SCSI bus, which must conform to the specification of the SCSI standard. A SCSI device refers to any device that is connected to the SCSI bus. Each SCSI device on the bus is assigned a SCSI ID that uniquely identifies the device during SCSI transactions.

The SCSI standard also establishes a set of protocols by which SCSI devices may communicate, or transact. When two SCSI devices communicate, one device acts as the initiator and the other as the target. The initiator begins a transaction by selecting a target device. The target responds to the selection and requests a command. The initiator then sends a SCSI command directing the target to perform a specified action, and the target performs the action.

Figure 7:
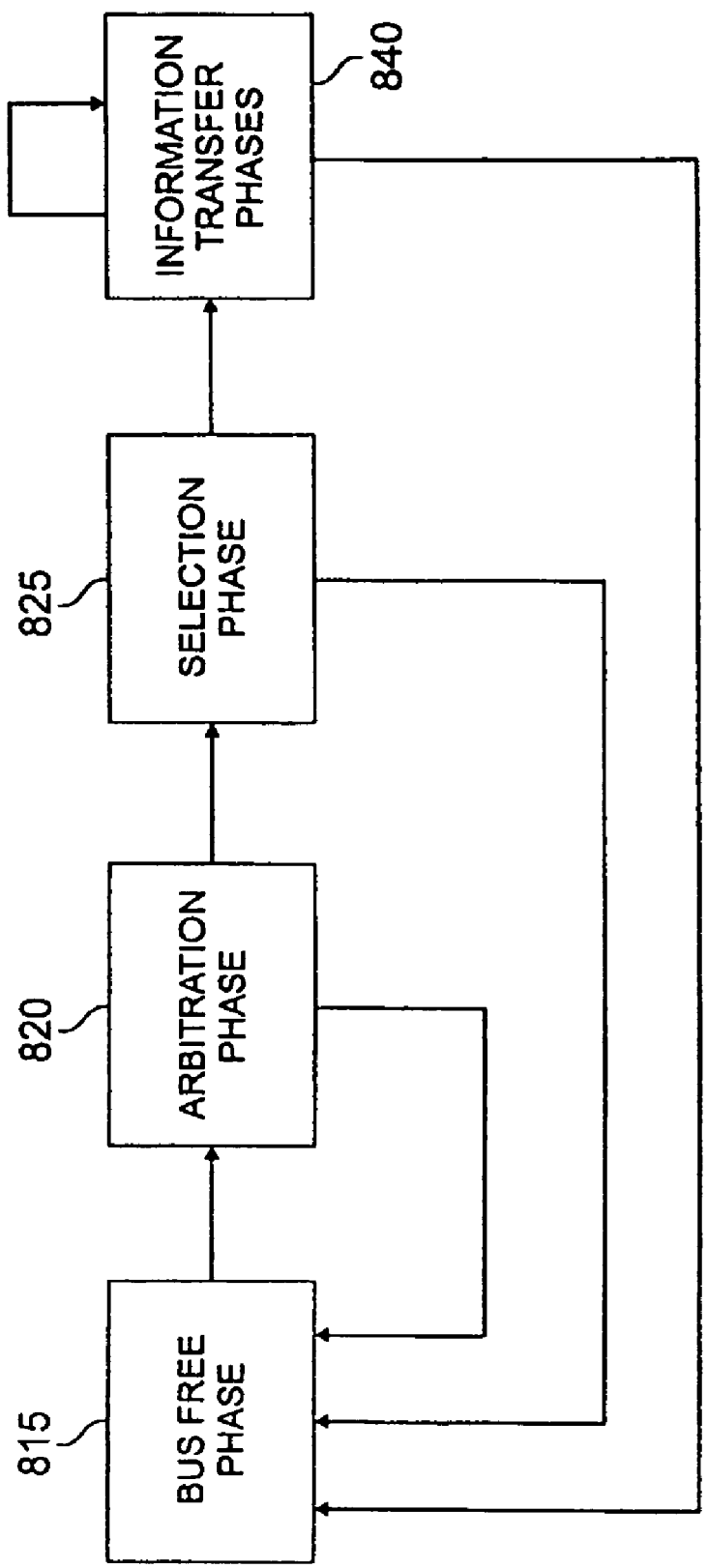
FIG. 7 is a block diagram showing the relationship of SCSI bus phases.

SCSI transactions comprise up to eight distinct phases: bus free, arbitration, selection, reselection, command, data, status and message. FIG. 7 is a block diagram showing the relationship of the SCSI bus phases. The bus free phase 815 indicates that no SCSI devices are using the SCSI bus. During arbitration phase 820, a SCSI device may gain control of the SCSI bus. All devices requesting to use the bus assert their SCSI ID by transmitting a signal onto the bus. The device having the highest ID wins the arbitration and becomes the initiator for the next SCSI transaction. During selection phase 825, the initiator selects a target device. The optional reselection phase (not shown) allows a peripheral that is busy performing a lengthy data processing action to disconnect from and subsequently reconnect to the SCSI bus.

The last four phases (command, data, status and message) are referred to collectively as the information transfer phases, and are represented in FIG. 7 by block 840. During these phases, data can be transferred between the initiator and target devices. During the command phase, a target device requests a command from the initiator, and in response, the initiator transfers a SCSI command to the target. A SCSI command is an instruction from an initiator to a target to perform an action, such as reading or writing a block of data. SCSI commands are contained in a data structure called a command descriptor block, which can be 6, 10 or 12 bytes in size. The first byte specifies the action requested, and the remaining bytes are parameters used for that action. The target can determine from the first command byte transmitted how many command bytes will follow.

During the data phase, data is transferred between the initiator and the target. To indicate that it is ready to transmit data to the initiator, the target transmits an input/output (I/O) signal indicating DATA IN. To indicate that it is ready to receive data, the target transmits a DATA OUT signal.

During the message phase, the target requests the transfer of a message. The SCSI standard specifies a number of possible messages that may be exchanged between SCSI devices. SCSI messages must conform to the structure specified by the SCSI standard and generally carry information about a SCSI transaction. The status phase occurs after completion of all commands and allows the target to transmit a status signal to the initiator. For example, the target may send status information indicating that an operation completed successfully, or that an error occurred. After a transaction is completed, the bus returns to the bus free phase 815.

Figure 8:
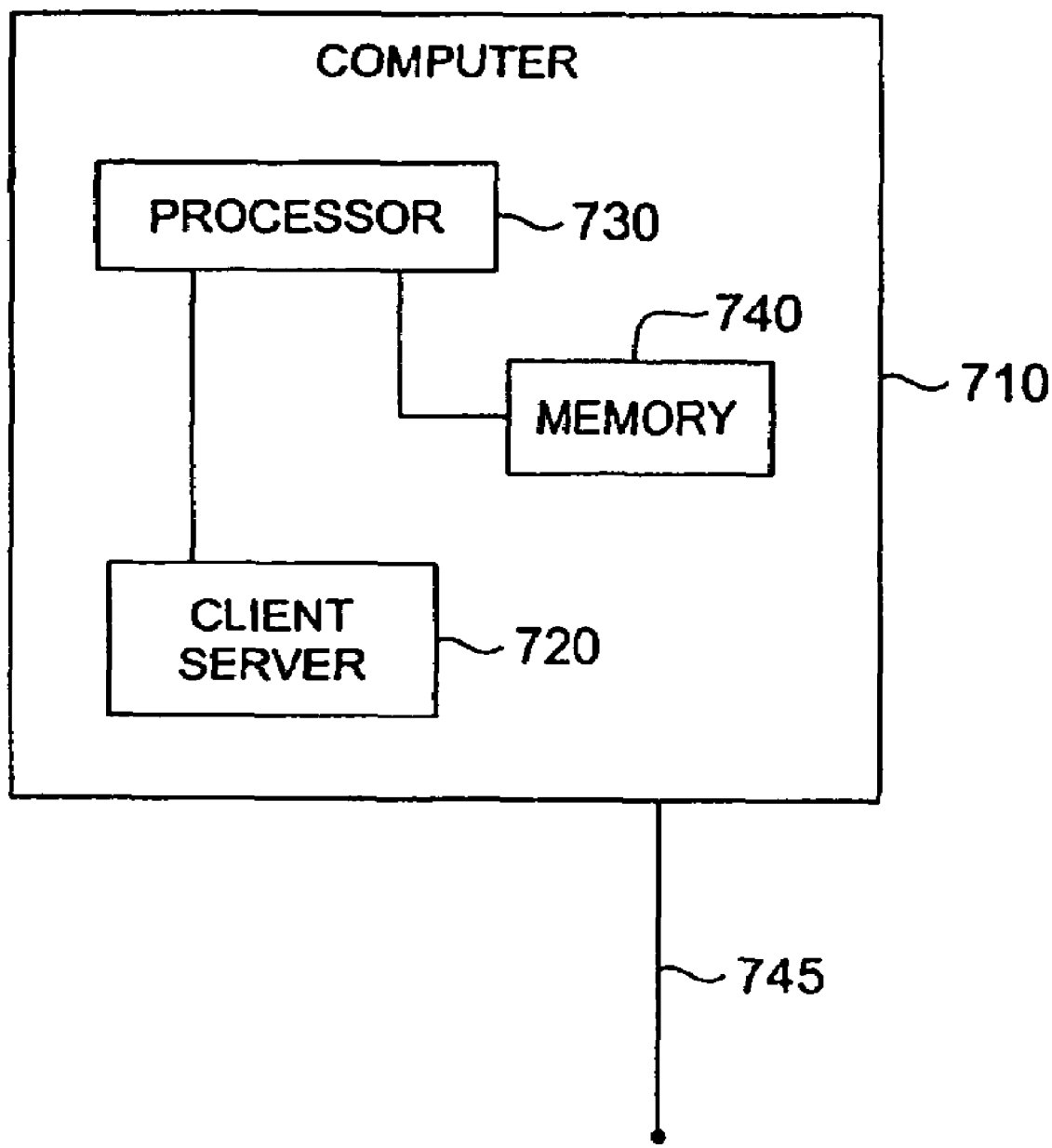
FIG. 8 shows a system for generating a SCSI command.

According to one aspect of the invention, a client server, in the role of initiator, sends a SCSI command to a storage system, acting as target, indicating that a snapshot should be performed. FIG. 8 shows system 710 for generating a SCSI command, in accordance with this implementation. System 710 is a computer, e.g., a workstation or a desktop PC. Computer 710 includes a processor 730, memory 740 and client server 720. Computer 710 is connected to network 150 along path 745 (as shown in FIG. 1). Path 745 is a connector that allows computer 710 to transmit SCSI commands via network 150 to storage system 210 (as shown in FIG. 1).

Client server 720 executes on computer 710. Client server 720 is, typically, a software application that provides software services and data to users. Referring to FIG. 1, client server 720 may be, for example, file server 140-1, email server 140-2 or remote access server 140-3.

In accordance with this implementation, client server 720 generates data processing requests for storage system 210 in accordance with SCSI protocols. Data processing requests are transmitted across network 150 in accordance with IP or Fibre Channel protocols, to storage system 210.

Figure 9:
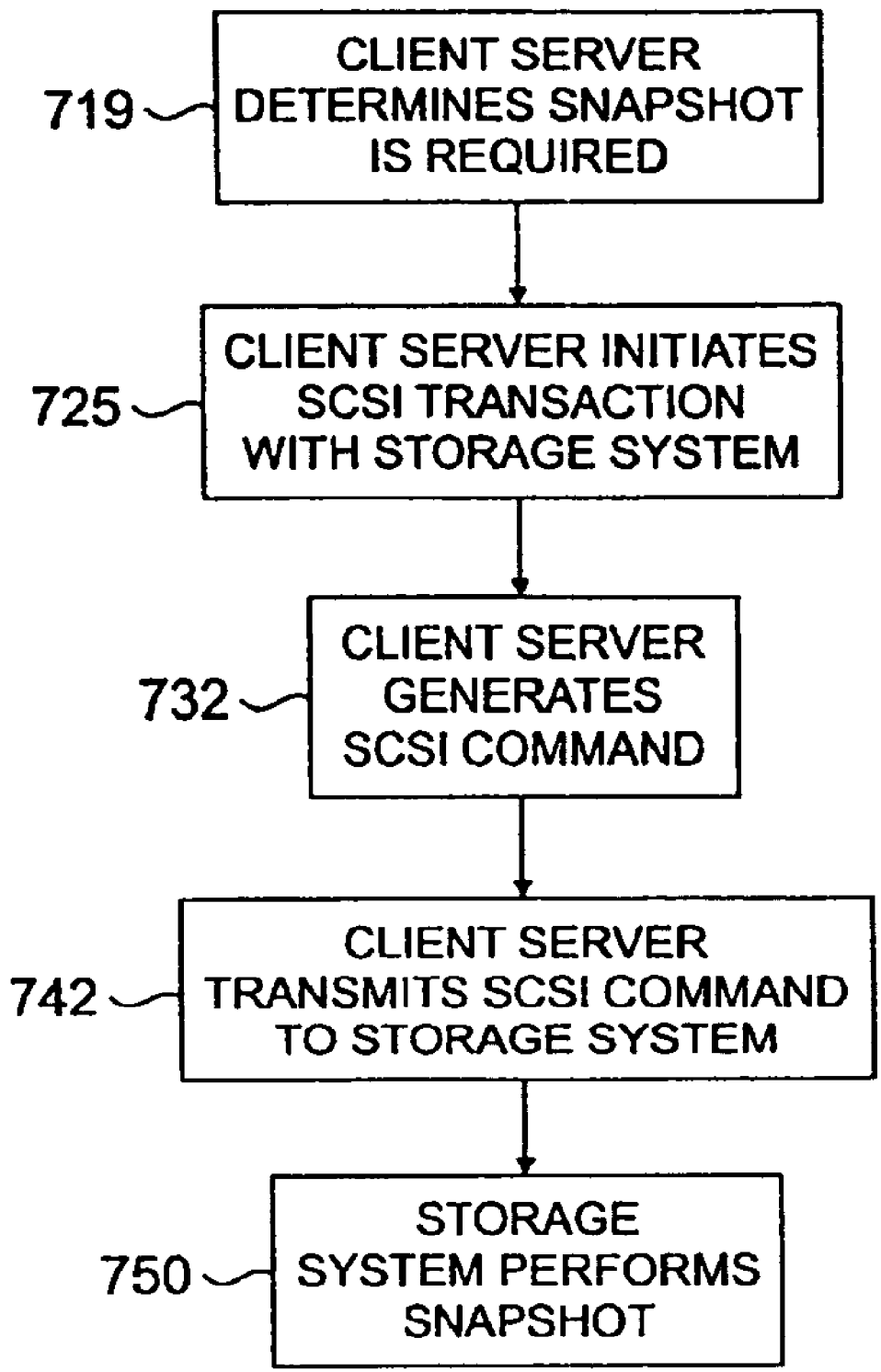
FIG. 9 is a flowchart showing a method for transmitting a command representing a snapshot request in accordance with one implementation of the invention.

FIG. 9 is a flowchart showing a method, in accordance with one implementation of the invention, for transmitting a command to a storage system indicating that a snapshot should be performed. At step 719, client server 720 determines that a snapshot is required. A variety of different conditions may prompt client server 720 to make this determination. Client server 720 may, for example, determine that a snapshot of a mirroring disk should be generated before synchronizing a mirroring disk with a primary disk. Alternatively, client server 720 may be prompted by a human administrator to initiate a snapshot. In yet another alternative, client server 720 may be a word processing application that automatically requests a snapshot under specified conditions.

At step 725, client server 720 initiates a SCSI transaction with storage system 210. Referring to FIG. 7, client server 720 arbitrates to use a SCSI bus in arbitration phase 820, and selects a target device in selection phase 825. In accordance with one implementation, client server 720 selects storage system manager 220 as the target. Alternatively, client server 720 may select a storage device as the target.

At step 732, client server 720 generates a SCSI command that represents a snapshot request. In accordance with this implementation, a customer-defined SCSI command is utilized to indicate that a snapshot be performed. Accordingly, client server 720 generates a command descriptor block (CDB) of 6, 10 or 12 bytes in size.

At step 742, client server 720 transmits the SCSI command over network 150 to storage system 210. Referring to FIG. 7, client server 720 transmits the SCSI command to storage system 210 during the command phase, which occurs during information transfer phases 840.

At step 750, storage system manager 220 receives the SCSI command and performs the requested snapshot. According to one implementation, storage system manager 220 receives the SCSI command and transmits a snapshot marker to cache 340 as described above. The snapshot is taken once the snapshot marker is flushed to disk.

In an alternative implementation, a storage system without a cache is employed. Client server 720 transmits the SCSI command to the storage system, which performs a snapshot by an alternative method.

I claim:

1. A method for recording data transmitted to a storage system, the storage system having a cache and at least one storage device, the method comprising:

maintaining, in a cache associated with at least one storage device, a queue comprising one or more first data items to be stored in the at least one storage device;

receiving a request to record data stored in the at least one storage device;

inserting a second data item into the queue, after the one or more first data items, after the request is received;

flushing at least one of the one or more first data items from the cache to the at least one storage device;

inserting into the queue one or more third data items, after inserting the second data item; and recording data stored in the at least one storage device, including the one or more first data items, in response to the request, after the second data item has been flushed from the cache.

2. The method of claim 1, wherein the cache comprises non-volatile memory.

3. The method of claim 1, wherein the cache comprises volatile memory.

4. The method of claim 1, wherein first data items and third data items are received from a single client server.

5. The method of claim 1, wherein first data items and third data items are received from a plurality of client servers.

6. The method of claim 1, wherein the at least one storage device comprises a block-level storage device.

7. A system for recording data transmitted to a storage system, comprising:
- at least one storage device configured to:
  - store data;
- a cache configured to:
  - maintain a queue comprising one or more first data items to be stored in the at least one storage device; and
- a controller configured to:
  - receive a request to record data stored in the at least one storage device;
  - insert a second data item into the queue, after the one or more first data items, after the request is received;
  - flush at least one of the one or more first data items from the cache to the at least one storage device;
  - insert into the queue one or more third data items, after inserting the second data item; and
  - record data stored in the at least one storage device, including the one or more first data items, in response to the request, after the second data item has been flushed from the cache.

8. The system of claim 7, wherein the cache comprises non-volatile memory.

9. The system of claim 7, wherein the cache comprises volatile memory.

10. The system of claim 7, wherein the one or more first data items and the one or more third data items are received from a single client server.

11. The system of claim 7, wherein the one or more first data items and the one or more third data items are received from a plurality of client servers.

12. The system of claim 7, wherein the at least one storage device comprises a block-level storage device.

13. A method to store data, comprising:
- receiving one or more data items by a storage system comprising at least one storage device;
- inserting the one or more data items into a cache associated with the at least one storage device;
- inserting a second data item into the cache, after a request to perform a data processing operation is received;
- flushing data from the cache to the at least one storage device, after inserting the second data item; and
- performing the requested data processing operation after the second data item has been flushed from the cache to the at least one storage device.

14. The method of claim 13, comprising:
- determining that the second data item has been flushed from the cache to the at least one storage device; and
- performing the requested data processing operation after it is determined that the second data item has been flushed from the cache to the at least one storage device.

15. The method of claim 13, wherein performing the data processing operation comprises:
- generating a record of data stored in the at least one storage device.

16. The method of claim 15, wherein generating a record of data comprises: generating a snapshot of data stored in the at least one storage device.

17. The method of claim 16, further comprising:
- backing up data stored in the at least one storage device, after generating the snapshot of data.

18. The method of claim 1, further comprising:
- determining that the second data item has been flushed from the cache.

* * * * *